(12) United States Patent
Whelan

(10) Patent No.: US 8,707,270 B2
(45) Date of Patent: Apr. 22, 2014

(54) METHOD AND SYSTEM FOR CONFIGURABLE PESSIMISTIC STATIC XSL OUTPUT VALIDATION

(75) Inventor: John Staehle Whelan, White Bear Lake, MN (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 950 days.

(21) Appl. No.: 12/707,215

(22) Filed: Feb. 17, 2010

(65) Prior Publication Data

US 2011/0202902 A1    Aug. 18, 2011

(51) Int. Cl.
*G06F 9/44* (2006.01)

(52) U.S. Cl.
USPC .......................... 717/126; 717/136; 717/141

(58) Field of Classification Search
USPC ............................... 717/124–167; 714/15–24
See application file for complete search history.

(56) References Cited

U.S. PATENT DOCUMENTS

2003/0149934 A1*   8/2003   Worden ................... 715/513

OTHER PUBLICATIONS

Jiang, Haifeng, et al. "Mapping-driven XML transformation." Proceedings of the 16th international conference on World Wide Web. ACM, 2007, pp. 1063-1072.*
Engelfriet, Joost, Hendrik Jan Hoogeboom, and Bart Samwel. "XML transformation by tree-walking transducers with invisible pebbles." Proceedings of the twenty-sixth ACM SIGMOD-SIGACT-SIGART symposium on Principles of database systems. ACM, 2007, pp. 63-72.*
Kinno, Akira, et al. "Environment adaptive XML transformation and its application to content delivery." Applications and the Internet, 2003. Proceedings. 2003 Symposium on. IEEE, 2003, pp. 1-8.*
Anders Moiler, et al., "Static Validation of XSL Transformations", Aug. 2007, 45 pages.; Others.

* cited by examiner

*Primary Examiner* — Satish Rampuria

(57) ABSTRACT

A system, method, and computer readable medium. A method includes loading a first language definition and a second language definition. The method includes loading a transformation definition corresponding to the first language definition and the second language definition and loading a validation rule definition. The method includes applying the validation rule definition to the transformation definition to produce a validation result indicating whether the transformation definition produces a valid transformation between the first language definition and the second language definition. The method includes storing the validation result.

12 Claims, 4 Drawing Sheets

METHOD AND SYSTEM FOR CONFIGURABLE PESSIMISTIC STATIC XSL OUTPUT VALIDATION

TECHNICAL FIELD

The present disclosure is directed, in general, to systems and methods for use in computer-aided design, manufacturing, engineering, modeling, and visualization (individually and collectively, "CAD" and "CAD systems") and in product lifecycle management ("PLM") and other systems.

BACKGROUND OF THE DISCLOSURE

Many manufactured products are first designed and modeled in CAD systems, and PLM systems are used my manufacturers, retailers, customer, and other users to manage the design, use, and disposal of various products. Improved systems are desirable.

SUMMARY OF THE DISCLOSURE

Various embodiments include a system, method, and computer readable medium. A method includes loading a first language definition and a second language definition. The method includes loading a transformation definition corresponding to the first language definition and the second language definition and loading a validation rule definition. The method includes applying the validation rule definition to the transformation definition to produce a validation result indicating whether the transformation definition produces a valid transformation between the first language definition and the second language definition. The method includes storing the validation result.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

The generation of Extensible Markup Language (XML) maps is generally tested by submitting test XML documents as input to a mapping system or application, and then validating the resulting XML documents output from the mapping system. While this works well in some cases, it limits the test coverage to the subset of documents used as input. When the input documents and transformations are particularly complex, or the number of transformations to be tested are large, the effort to provide adequate input data for testing becomes prohibitive. At the same time, missing a mapping error at design time can result in a run-time error that is expensive to fix.

Disclosed embodiments include a system and method that performs extendable, static, pessimistic validation. Disclosed techniques can be re-used across multiple transformation definitions (also referred to herein as mappings) without requiring the effort of generating specific test input documents.

Figure 1:
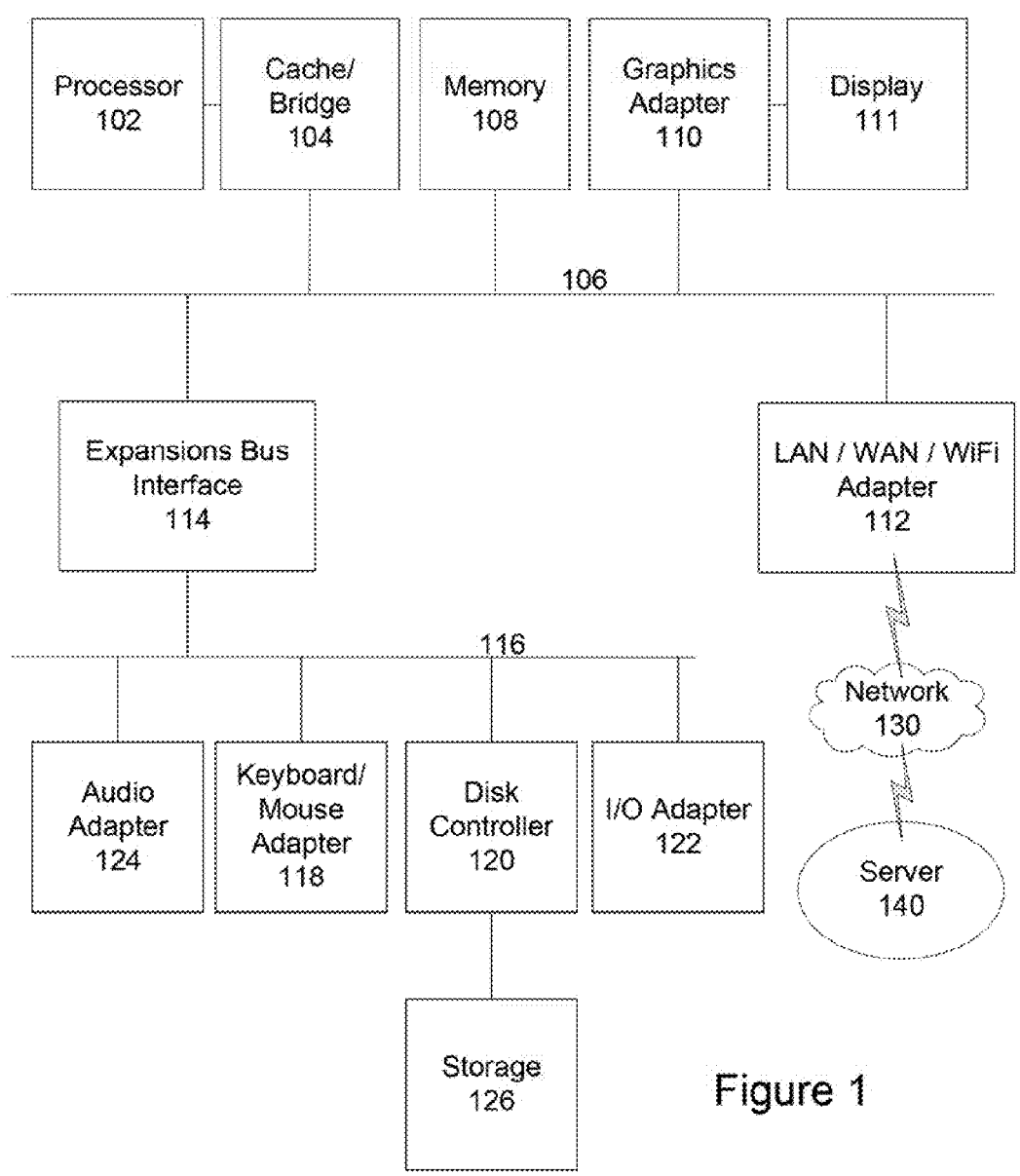
FIG. 1 depicts a block diagram of a data processing system in which an embodiment can be implemented.

FIG. 1 depicts a block diagram of a data processing system in which an embodiment can be implemented as either a client system or server system for performing XML mapping validation as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

In the XML environment, XML schema definitions (XSD) or document type definitions (DTDs) are often used to define the particular structure and rules of a particular XML implementation. Often, data used in one system or application conforms to one XML schema, while data used in another system or application conforms to another XML schema. Of course, those of skill in the art recognize that other XML-type standards may be used, and the embodiments discussed herein are not limited to XSD, DTD, the Regular Language for XML Next Generation (RELAX NG), or other schema language.

To convert between schemas, extensible stylesheet language (XSL) can be used to perform an XSL transformation (XSLT). The XSL documents include mapping rules to convert an XML input document conforming to a first schema into an output XML document conforming to a second schema. An XSL document generally includes a language for transforming XML documents (XSLT) and an XML vocabulary for specifying formatting semantics. An XSL stylesheet specifies the presentation of a class of XML documents by describing how an instance of the class is transformed into an XML document that uses the formatting vocabulary.

Disclosed embodiments perform a validation process to ensure that XSL documents produce resultant XML which is valid for the second (output) XML schema. The various embodiments provide a configurable, pessimistic, static validation of an XML mapping. Specifically, the systems and methods use configured validation rules to insure compliance. Since a fully automatic solution that is both sound and complete is not possible, the static validation problem is regarded as mathematically undecidable. This approach allows specific subset of popular XSL constructs to be validated, and is flexible to include additional validation tests as needed.

Disclosed processes identify pairs of input and output constructs which are associated via an XSL mapping, and further specify the associated rules for comparing the constructs in the associated schema constructs. The implementation contains a reusable library of common or popular validation rules.

Figure 2:
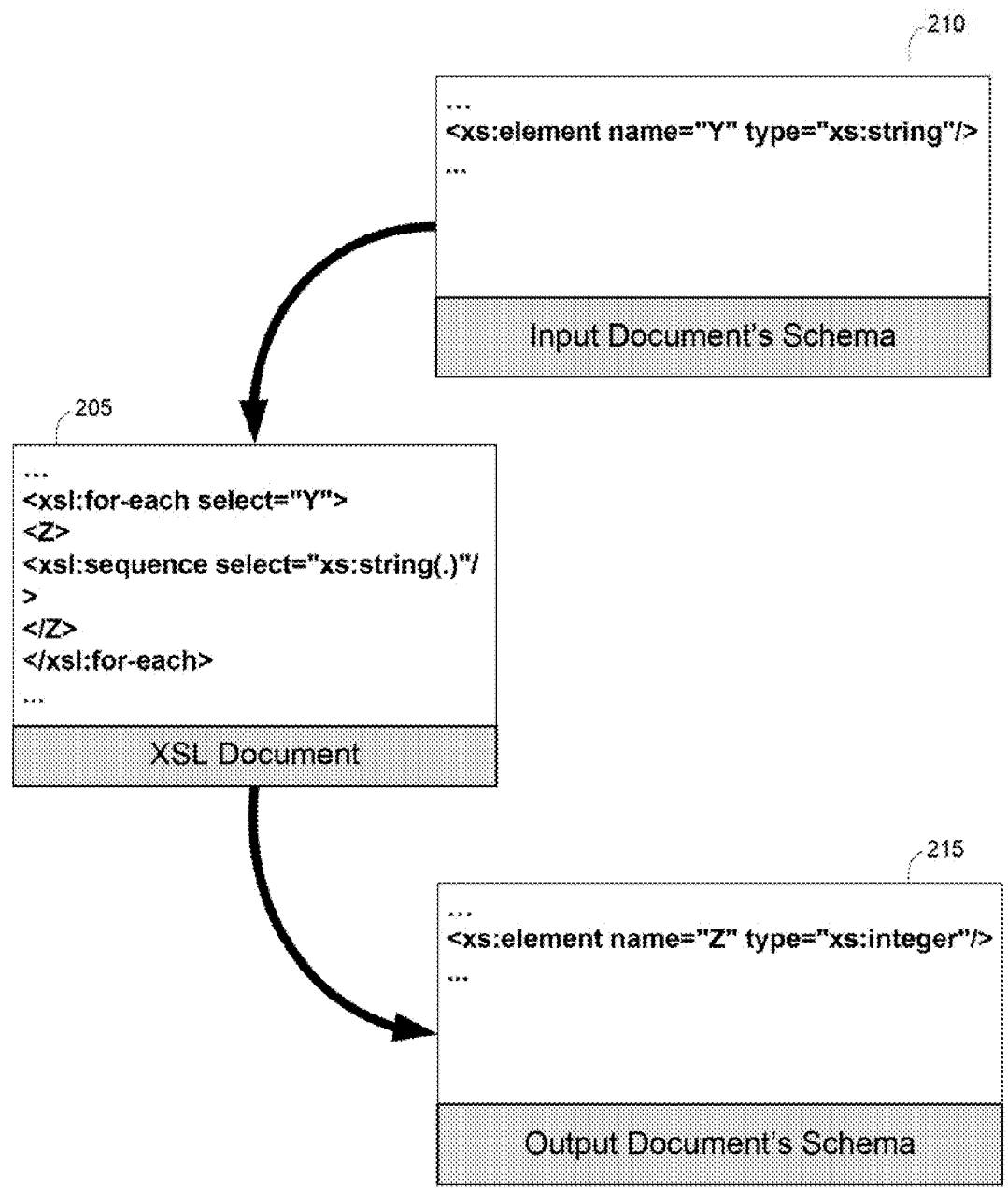
FIG. 2 depicts an exemplary diagram that illustrates a process in accordance with a disclosed embodiment.

FIG. 2 depicts an exemplary diagram that illustrates a process in accordance with a disclosed embodiment. Other implementations are possible, such as additional levels or arbitrary levels of traversal, are possible.

As described herein, in some embodiments, the rules work by identifying instances of specific types of transformations in an XSL document, shown in this example as a snippet of XSL document 205, as related to the input document's schema 210 and the output document's schema 215. For example, one such transformation may be the creation of an element in the output document that corresponds to an element of the input document.

The system identifies the input for each transformation instance; for example, selection elements named Y, shown in this example for XSL document 205 selecting each element "Y" in the input schema 210.

The system identifies the output for each transformation instance; for example, the transformation generates an element named Z, shown in this example as:

```
<Z>
<xsl:sequence select="xs:string(.)"/>
</Z>
```

The system obtains schema information on the input and output types from the associated schemas. Input schema 210 is shown in this example as
    <xs:element name="Y" type="xs:string"/>
Similarly, output schema 215 is shown in this example as
    <xs:element name="Z" type="xs:integer"/>
The system then compares details on the schema details to determine inconsistencies; for example, the system determines if the input attribute is optional while the output attribute is required. In this specific example, the system identifies that integer element Z of the output schema 215 is set by XSL document 205 by string element Y of the input schema 210, which can produce an invalid output document.

The system then produces a validation result showing the comparisons, and indicating any inconsistencies that could not be validated.

Figure 3:
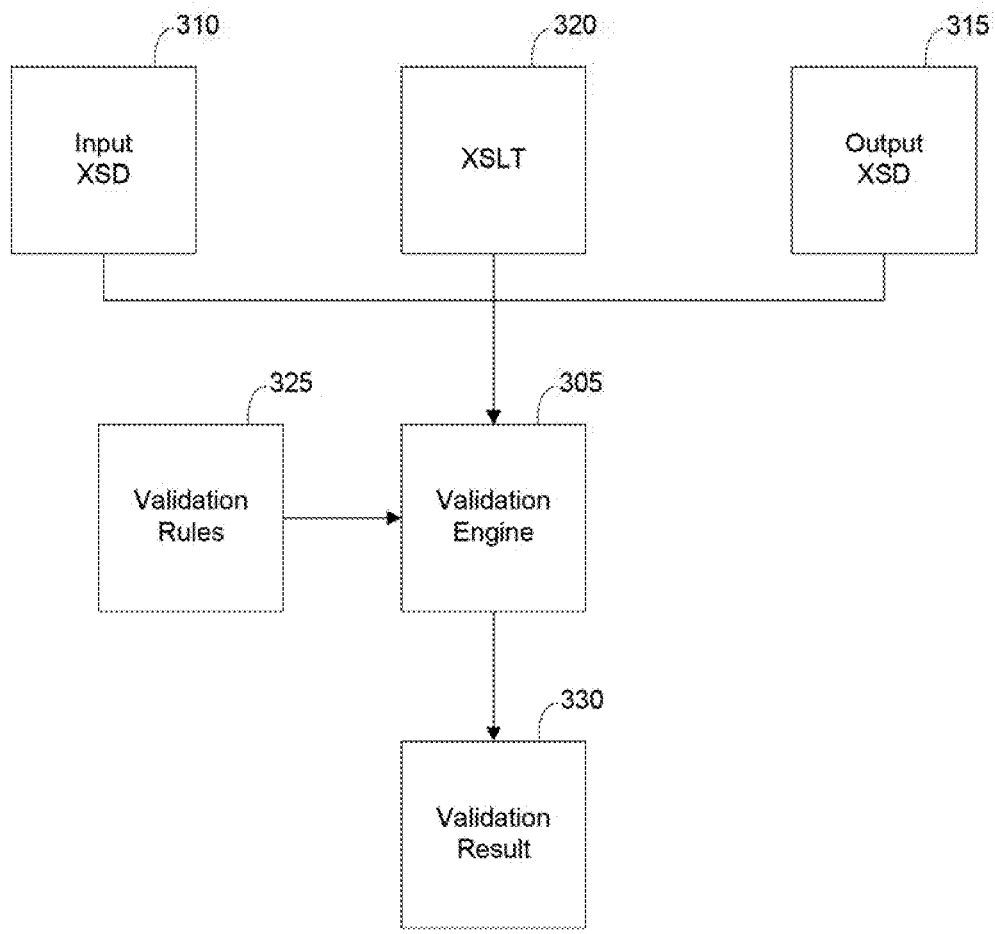
FIG. 3 depicts a simplified block diagram in accordance with disclosed embodiments.

FIG. 3 depicts a simplified block diagram in accordance with disclosed embodiments. This exemplary embodiment uses as validation engine 305 that validates XSLT transforms, but those of skill in the art will recognize that the techniques disclosed herein can be applied to validating transformation and translations of other data formats.

Validation engine 305 can be implemented, for example, on a configured data processing system 100, as either a client system, a server system, or a standalone data processing system. Validation engine 305 loads the appropriate inputs, performs the validations, and produces a validation output.

As used herein, "loading" or "receiving" can include loading from storage, receiving from a different system or application, receiving over a network, receiving from a user, or other means of receiving or loading the indicated data as known to those of skill in the art.

In this example, validation engine receives as input the input XSD file 310 and the output XSD file 315, as well as the XLST file 320 that is used to perform the transform between XML documents that conform to the input XSD to documents that conform to the output XSD. The validation engine 305 also loads validation rules 325.

The validation rules 225 are applied to the XSLT 320, and verified against the input XSD 310 and the output XSD 315. The validation engine 305 verifies that the elements identified by the validation rules 325, which are assumed to be valid in the input XSD 210, are still valid in the output XSD 315 after the XSLT 320 is applied.

The validation engine produces an output validation result 330, which can be stored in the system, displayed to a user, and/or transmitted to another system. The validation result 330 can be used to modify or correct the XSLT to eliminate any validation errors.

As an example, the following rule would identify XSL transformations where element content is mapped between different XML schema types. Of course, this exemplary code merely illustrates one possible testing rule, as understood by those of skill in the art:

```
Test1 {
    Rulename = "MapForce 2008 - element to element line typing";
    inputSchema = "D:\\sandbox\\XSL_Validator\\input.xsd";
    outputSchema = "D:\\sandbox\\XSL_Validator\\output.xsd";
    mapping = "D:\\sandbox\\XSL_Validator\\mapping.xslt";
    sourceFind = "//xsl:for-each[not(contains(@select,'$'))]";
    sourceIdentifier = "./@select";
    sourceKind = "//xs:element[@name='%leftID%']/@type";
    destFind = "./*";
    destIdentifier = "local-name( )";
    destKind = "//xs:element[@name='%rightID%']/@type";
}
```

In this example, the system selects constructs (sourceFind) in the defined mapping (mapping). The system obtains an identifier for the construct, and the system obtains a 'kind' from the input Schema. The system then performs a similar process for the destination side, and then obtains a 'kind' for the destination.

The system processes comparisons of 'kinds' to determine potential validation problems; the processing of the 'kind' comparisons uses simple conditional logic to raise errors. The example implementation can validate transformation definitions of types, string lengths, required attributes, and other validations.

Disclosed embodiments allow arbitrary rules to be written to validate XSL Transformations, thus providing a capability to detect validation problems with arbitrarily complex XSL containing arbitrary XPath functions, including custom XPath functions. This allows for the rules list to be augmented when new XSL validations are needed.

Figure 4:
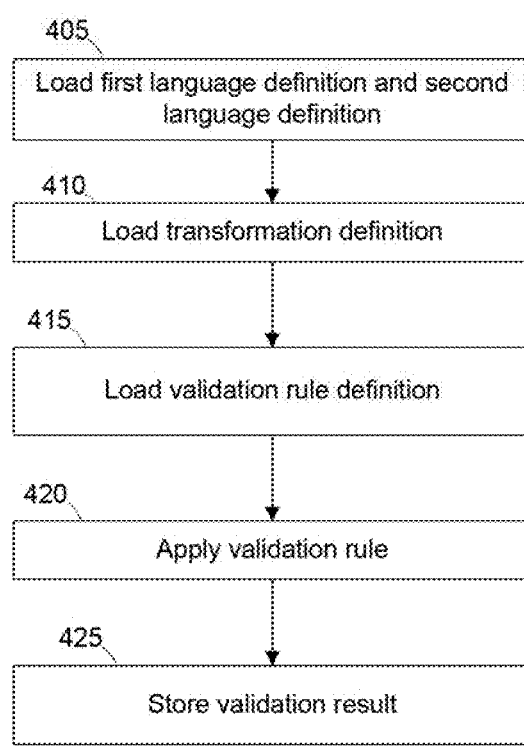
FIG. 4 depicts a flowchart of a process in accordance with disclosed embodiments.

FIG. 4 depicts a flowchart of a process in accordance with disclosed embodiments.

The system loads a first language definition and a second language definition (step 405). In some embodiments, these are both XSD files or other XML stylesheets, document type definitions, or similar definitions.

The system loads a transformation definition (step 410) that maps at a first construct of the first language definition to at least a second construct of the second language definition. In some embodiments, this is an XSL file specifying an XSLT.

The system loads a validation rule definition (step 415) that includes at least one validation rule corresponding to the first construct and the second construct, and that defines a successful transformation between the first construct and the second construct. In some embodiments, this is a set of validation rules.

The system applies the validation rule (step 420) to the transformation definition to determine if the transformation definition produces a validation result according to the first construct and the second construct. The validation result can indicate whether the transformation definition produces a valid transformation between the first language definition and the second language definition for those constructs.

The system stores the validation result (step 425).

Various embodiments disclosed herein provide a standard, reusable, generic ability to validate data transformation logic. The disclosure is relevant to any environment where XML data is being shared between end-points which require different data schemas. The disclosed techniques can be applied in order to support a reusable, standard, consistent level of validation for different transformations.

Industry standards in the area of XML transformation favor the use of graphical tools to generate XML mappings. While there are usually several ways in which an XSLT document can physically implement a logical transform, the resulting XSLT files from these machine-generated mappings tend to standardize on the XSL constructs that they use to transform XML documents. The use of these tools aligns quite nicely with strengths of the disclosed embodiments.

The industry standards associated with validating XSL transformations has focused on two efforts. First and foremost, the industry has focused on XML validation of test document processing results. Additionally, the academic world has been working towards static validation using flow analysis of XSL documents, which allows for validations in overall structure of outputs, but does not address validation of specific values.

In some embodiments, the validation rules are included as hard-coded content inside the code of an implementation.

A different approach for static validation of XSL transformations is described in "Static Validation of XSL Transformations" by Anders Moiler et al., and is hereby incorporated by reference. This approach constructs graphs of output possibilities by mining the relationships between templates in an XSL, and then validating overall structure. This differs from the disclosed embodiments, for example in that the disclosed processes validates valid values for specific output types, but without being limited by the overall structure.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for transformation validation implemented by a data processing system, comprising:
   loading, in a data processing system, a first language definition and a second language definition;
   loading, in the data processing system, a transformation definition corresponding to the first language definition and the second language definition, wherein the transformation definition maps a first construct of the first language definition to a second construct of the second language definition;
   loading, in the data processing system, a validation rule definition, wherein the validation rule definition defines a successful transformation between the first construct and the second construct and indicates whether the transformation definition produces a valid transformation between the first construct and the second construct; and
   applying the validation rule definition to the transformation definition by the data processing system to produce a validation result indicating whether the transformation definition produces a valid transformation between the first language definition and the second language definition; and
   storing the validation result in the data processing system.

2. The method of claim 1, wherein the first language definition is an extensible markup language schema definition.

3. The method of claim 1, wherein the first language definition is a document type definition.

4. The method of claim 1, wherein the transformation definition is an extensible stylesheet language file specifying an extensible stylesheet language transformation.

5. A data processing system comprising a processor and accessible memory, the data processing system particularly configured to perform the steps of:
   loading a first language definition and a second language definition;
      loading a transformation definition corresponding to the first language definition and the second language definition, wherein the transformation definition maps a first construct of the first language definition to a second construct of the second language definition;
   loading a validation rule definition, wherein the validation rule definition defines a successful transformation between the first construct and the second construct and indicates whether the transformation definition produces a valid transformation between the first construct and the second construct; and
   applying the validation rule definition to the transformation definition to produce a validation result indicating whether the transformation definition produces a valid transformation between the first language definition and the second language definition; and
   storing the validation result.

6. The data processing system of claim 5, wherein the first language definition is an extensible markup language schema definition.

7. The data processing system of claim 5, wherein the first language definition is document type definition.

8. The data processing system of claim 5, wherein the transformation definition is an extensible stylesheet language file specifying an extensible stylesheet language transformation.

9. A non-transitory computer-readable storage medium encoded with computer-executable instructions that, when executed, cause a data processing system to perform the steps of:
   loading a first language definition and a second language definition;
      loading a transformation definition corresponding to the first language definition and the second language definition, wherein the transformation definition maps a first construct of the first language definition to a second construct of the second language definition;
   loading a validation rule definition, wherein the validation rule definition defines a successful transformation between the first construct and the second construct and indicates whether the transformation definition produces a valid transformation between the first construct and the second construct; and
   applying the validation rule definition to the transformation definition to produce a validation result indicating whether the transformation definition produces a valid transformation between the first language definition and the second language definition; and
   storing the validation result.

10. The computer-readable storage medium of claim 9, wherein the first language definition is an extensible markup language schema definition.

11. The computer-readable storage medium of claim 9, wherein the first language definition is a document type definition.

12. The computer-readable storage medium of claim 9, wherein the transformation definition is an extensible stylesheet language file specifying an extensible stylesheet language transformation.

\* \* \* \* \*